Sheet 2. 2Sheets.

W & T. Schnebly.
Harvester Rake.

Nº 16658      Patented Feb. 17, 1857.

UNITED STATES PATENT OFFICE.

WM. SCHNEBLY AND THOS. SCHNEBLY, OF HACKENSACK, NEW JERSEY.

IMPROVEMENT IN MACHINES FOR HARVESTING GRAIN AND GRASS.

Specification forming part of Letters Patent No. 16,658, dated February 17, 1857.

*To all whom it may concern:*

Be it known that we, WILLIAM SCHNEBLY and THOMAS SCHNEBLY, of Hackensack, in the county of Bergen and State of New Jersey, have invented a new and Improved Mode of Harvesting Grain and Grass; and we do hereby declare that the following is a full and exact description thereof, reference being had to the accompanying drawings, and to letters of reference marked thereon.

The nature of our invention consists in the combination of a peculiarly-formed finger or guard with the cutters of grain and grass harvesters, as will hereinafter be more fully described.

Figure 1:
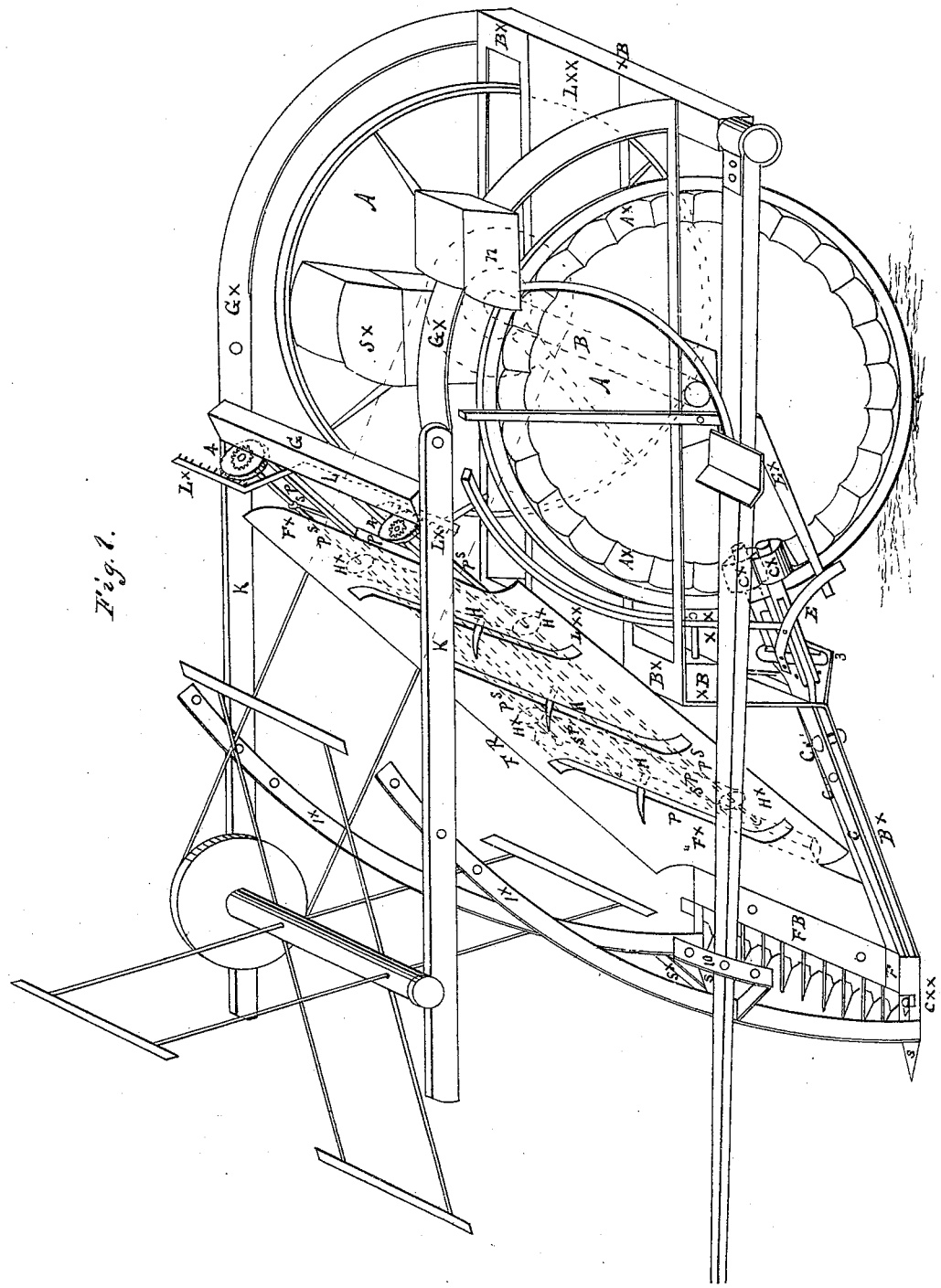

Figure 1 represents a perspective view of the machine. A A are ground-wheels, which support the frame, on which the machine may be readily turned to the right or left or propelled forward, the said wheels being also the fulcrum of the frame. The duty of elevating or depressing the cutters may be easily accomplished by means of the connection of the frame with the tongue or pole. $A^\times A^\times$ are corrugated rims attached to one or both wheels, by which means a vibratory motion is communicated to the cutters when one or two levers are connected thereto having friction-rollers on the ends running against the corrugated rims. When two levers are used for this purpose the cutter-blade may be stretched or strained on the principle of a wood-saw, by which arrangement many advantages may be derived. In our present plan we use one lever only. C is a lever having its fulcrum $C''$ in the frame $B^\times$. On the upper end it is made with two branches. The end of each branch or prong has on it a friction-roller, $C^\times C^\times$, and which are made to run against the rims $A^\times A^\times$, the lower end being connected with the cutter-blade. 3 is a friction-roller arranged with its axis in the center of the distance between the branches or prongs, and rests on a plate below, which is attached to the frame $B^\times$, which is designed to keep the lever C in a proper line when it is made to vibrate. $B^\times B^\times$ are parallel frame-pieces inclined from a point so as to bring the lever C in a line with the axis of the wheels A A and with the cutter or plane of the earth where they are connected with the ends of the finger-bar F B. On the upper or rear ends they are made fast to the cross-beam X B, thus affording a space for the platform, which is partially inclined and partially horizontal, also for the raking apparatus when used as a reaper, or a space for the mowed grass to fall into in rear of the finger-bar F B when used as a mower. The tongue-piece T is laid horizontal, and may be made in one or two pieces, now hinged in the rear to the cross-piece X B and at a point in a line, or nearly so, with the cutter and finger-bar to the iron stanchion 10, which is raised up from the finger-bar or shoe S below. When made in two pieces a suitable device for elevating or depressing the front of the machine must be made. One similar to the present stanchion 10, with a series of holes and a movable bolt, may be attached and found to answer—as, for example, if that portion from the stanchion 10 to the cross-piece X B be permanently fixed, then the tongue part, to which the horses are hitched, must be hinged at the rear end, as it is now, and the front made to elevate or depress by having a movable bolt to confine it to either of the holes in the stanchion 10. The beam or tongue-piece T must be thrown out from the frame-piece $B^\times$ and the side of the platform, so as to give sufficient space for the grain to fall to the ground when removed from the platform without interruption, when it will be left in readiness for binding on the side of the swath being cut and in rear of the horses. The stanchion 10 or its equivalent $1^\times$ may be carried up in front of the cutters. $G^\times G^\times$ are stanchions raised up from the frame $B^\times$ in the rear, and support the reel-braces K K. $E^\times$ is a brake-lever having its fulcrum in the side of the frame, and is designed to operate on the spring-piece E, and throws off the rollers $C^\times C^\times$ from contact with the rims $A^\times$, and checks the motion of the cutters, &c. N is a driver's seat attached to the frame. $S^\times$ is a seat which may be used, when necessary, to assist in discharging the grain from the platform, being in rear of the same.

Figure 2:
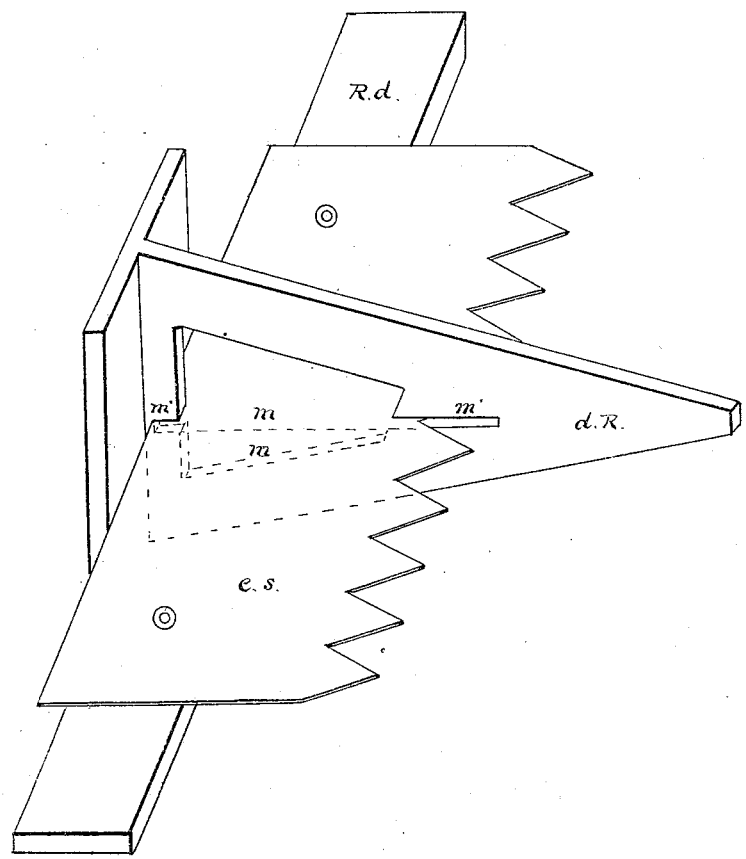

Fig. 2 represents a perspective view of a thin trapezoidal-shaped finger or guard with a section of a cutter, E S, having teeth or cutters of reduced size, multiplied in number and in close proximity. The trapezoidal finger is made thin, so as to cause it to pass freely into the standing grain or grass, and without being liable to press the standing stalks from their natural position while being cut. The finger or guard is constructed with an open area or space, M M, conforming to the same figure, and with recesses M″ and M′ in front and rear to support the cutters and guide the same as they are made to vibrate in the said recesses M″ and M′, while the enlarged area M M entirely relieves the cutter from any contact and removes the difficulty heretofore experienced from the accumulation of particles of stalks, grit, &c., when using a finger or guard with long recesses or slots and made of the usual thickness. The recess M″ in front is made long enough to afford space between the points of the teeth or cutters to prevent contact and permit a good clearance for obnoxious particles.

By using the thin guard or finger thus formed, and by placing them in close proximity to each on the bar or finger-board, we are enabled to accomplish the following objects or results:

First. To divide the swath of grain or grass designed to be cut into a great number of small parcels in proportion to the size of the space between each of the guards, and to confine each small parcel of grain or grass in its natural position, or successfully raise the same when lodged or beaten down and hold it securely during the process of severing the same by a series of small cutters, three or more of which are made to vibrate and do their duty, each by little and little, as they pass through each of these separated small parcels of grain or grass thus divided and confined by the guards. This arrangement changes the process of cutting from that of large, long, wide guards, and may be compared to a crosscut-saw severing a log and a large saw doing the same on the other hand. The one discharges its fine particles of dust without clogging, the other sticks fast often in between its large chips, the disengagement of which consumes time and power.

Secondly. We can the more readily relieve the mowed grass when it falls upon the finger-board, as the distance from the point of the cutters to the rear edge of the finger-bar is greatly reduced, the fingers or guards being made much shorter than ordinary fingers, and the blade or cutter much less in width.

Thirdly. The close proximity of the fingers or guards affords a protection and safeguard to the cutters when encountering dangerous obstacles, as their mode of resistance is on the same principle as that of cutting—that is, many points strike the object instead of one, thus dividing the force of the concussion among the many, which would prove disastrous to a single one. The cutter is made of thin steel plate and confined to a flat rod, R d, by means of rivets.

E S represents a section of a full-size cutter with the teeth or sharp angles about half an inch on each side. The teeth or cutters may be beveled on the top and under edges, and readily kept in good order by using a fine file occasionally instead of a grindstone. The teeth or cutters being small and the fingers being in close proximity with a rapid vibratory motion to the cutters, passing three or more teeth through each recess of the guards, makes a decided and effectual cut, and prevents the machine from clogging entirely. In all the experiments we have made since 1825 we have never found any other method for cutting grain or grass equal to our present plan of the thin trapezoidal guard and small cutters, which effectually removes all the difficulties heretofore experienced, and renders the harvester more perfect in its operation.

What we claim as our invention, and desire to secure by Letters Patent, is—

The thin trapezoidal-shaped finger or guard, in combination with cutters E S when said finger is constructed with an open area or space, M M, conforming to the same figure, and with recesses M″ M′ in front and rear to support and guide the cutters near the center of the finger or guard, substantially in the manner herein described.

WM. SCHNEBLY.
THOS. SCHNEBLY.

Witnesses:
GEORGE WYGANT,
MICHAEL M. WYGANT.